J. WALTER.
Cultivating Hops.
No. 60,099.
Patented Nov. 27, 1866.
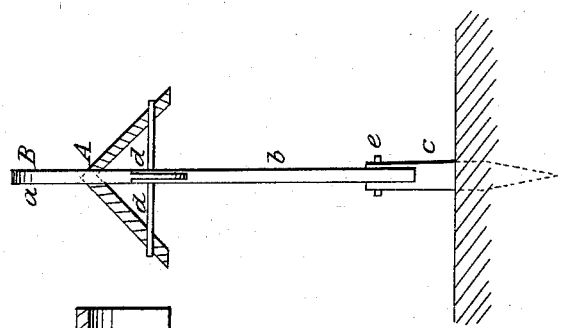
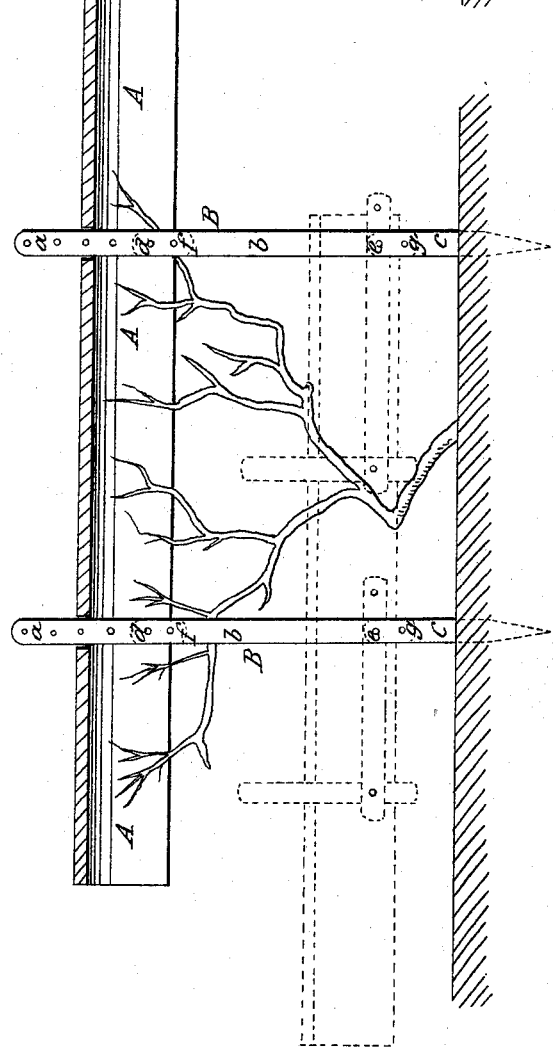
Witnesses:
Theo. Tusche
Wm. Truvin.
Inventor:
John Walter
Per Munn & Co.
Attys

United States Patent Office.

IMPROVEMENT IN GRAPE-VINE PROTECTORS.

JOHN WALTER, OF PRINCETON, ILLINOIS.

Letters Patent No. 60,099, dated November 27, 1866.

SPECIFICATION.

TO ALL WHOM IT MAY CONCERN:

Be it known that I, JOHN WALTER, of Princeton, in the county of Bureau, and State of Illinois, have invented an improved Grape-Vine Protector; and I do hereby declare that the following is a full, clear, and exact description thereof, which will enable others skilled in the art to make and use the same, reference being had to the accompanying drawings, forming a part of this specification, in which—

Figure 1 represents a longitudinal sectional elevation of my improved grape-vine protector.

Figure 2 is a cross sectional elevation of the same.

This invention relates to an apparatus which is designed to protect the grape vines, and other plants of similar nature, from the injurious effects of the mildew in summer, and from the frost in winter. And my improvement consists in so supporting a small roof which covers the plant and protects it from mildew, that the said roof will be adjustable vertically for plants of different height, and that it may also, in winter time, be folded down, so as to be close to the ground, when it will be covered with straw or other suitable material, and thus protect the plant against injuries from frost. It is a well-established fact that the mildew does only descend vertically upon the plants, and that when the plant is shielded against it from the top, the mildew will never approach it from the sides or bottom.

Upon this principle I have constructed a long, narrow roof, A, consisting of two boards nailed together at an angle of ninety or more or less degrees. This roof will prevent the mildew from falling upon the plant, while it does not at all exclude the rays of the sun, which are so necessary for the development of the vine plant. The roof, A, is supported by two or more standards, B, consisting of three pieces, $a$, $b$, and $c$, hinged together, as seen in the drawings. The lower piece, $c$, is driven into the ground; to it is pivoted the middle piece, $b$, and to the latter the upper piece, $a$, as seen. The pin $d$, which is the pivot for the bars $c$ and $a$, extends to the sides and passes through the walls of the roof, which is thus supported. The pieces $b$ and $c$ swing on the pin $e$. When upright in summer, two extra pins, $f$ and $g$, are inserted in each support, B, to prevent the different pieces from folding. The plant is secured to the roof by means of laths or strips of leather, or in any other well-known manner. In winter the roof is folded down, as shown in red lines in fig. 1, when it may be readily covered with straw or manure, and the plant will thus be protected from the effects of the frost.

Having thus described my invention, I claim as new, and desire to secure by Letters Patent—

A grape-vine protector, made and operating substantially as herein shown and described.

JOHN WALTER.

Witnesses:
JOEL PENNINGTON,
WM. SPEIUR.